Feb. 28, 1950     J. B. MOORE     2,499,031
LIQUID FUEL DISPENSER HAVING A ROTATABLY
POSITIONABLE REGISTER
Filed May 10, 1944                                     2 Sheets-Sheet 1
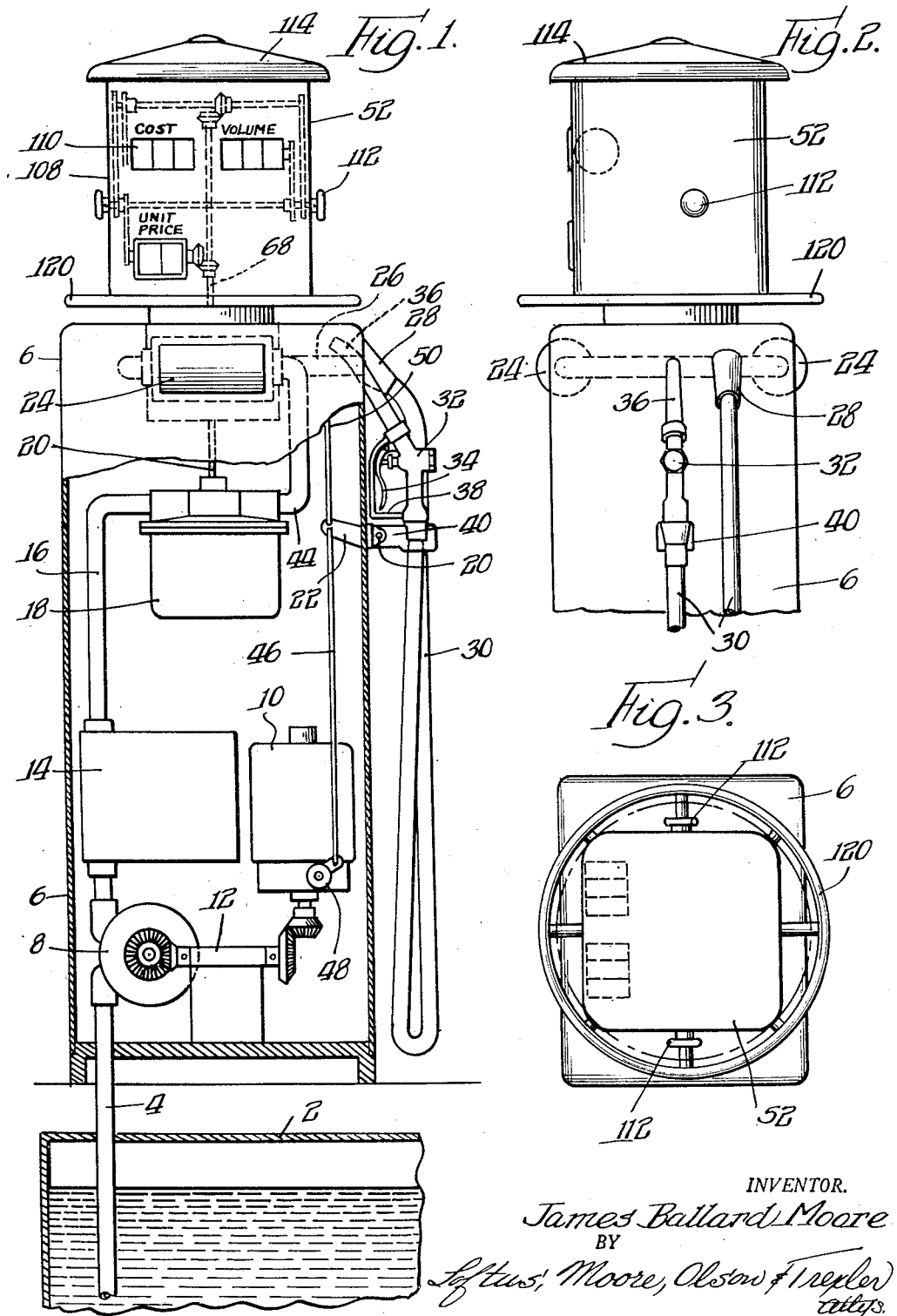
INVENTOR.
James Ballard Moore
BY
Loftus, Moore, Olson & Trexler
attys.

Feb. 28, 1950 J. B. MOORE 2,499,031
LIQUID FUEL DISPENSER HAVING A ROTATABLY
POSITIONABLE REGISTER
Filed May 10, 1944 2 Sheets-Sheet 2
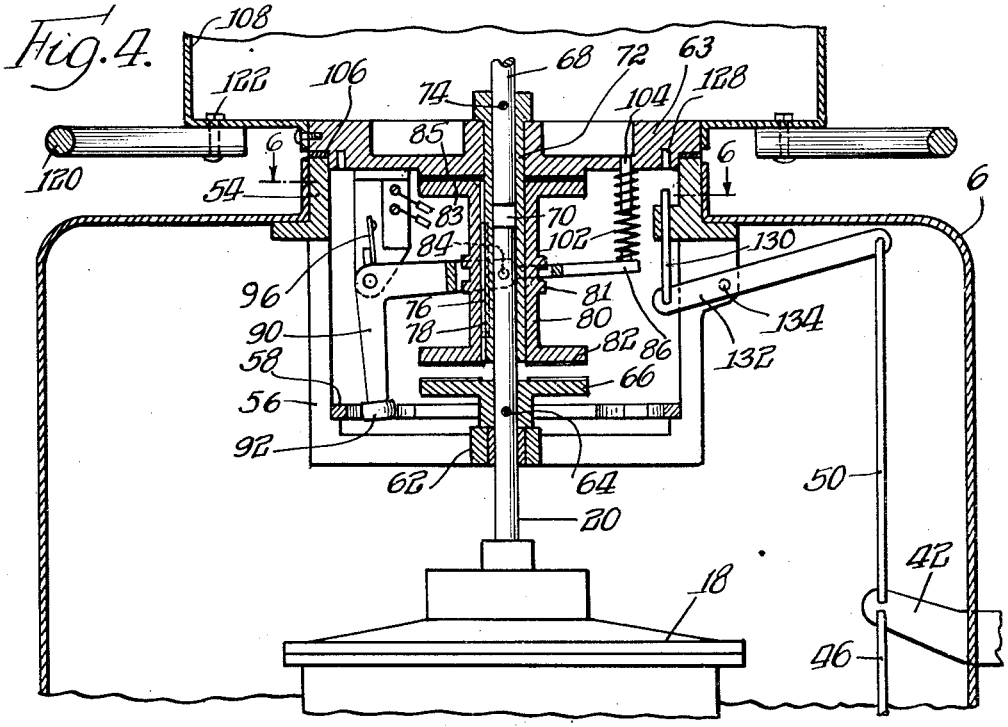
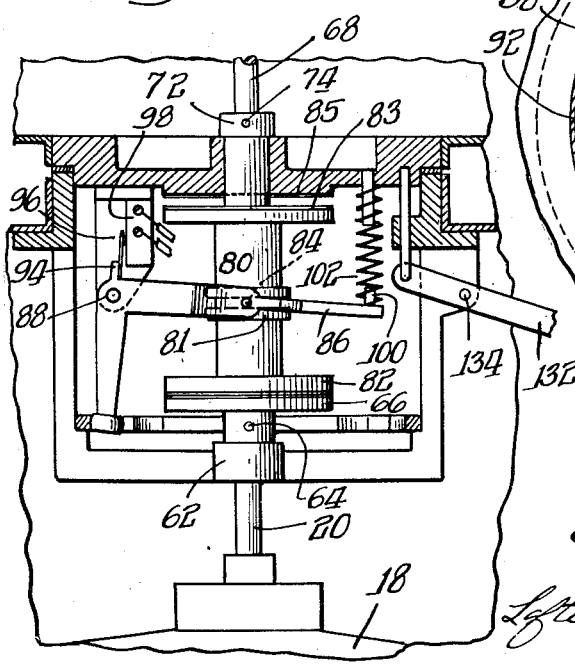
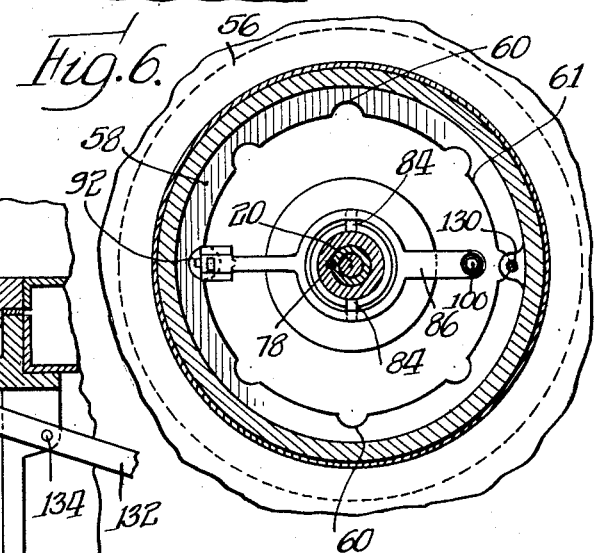
INVENTOR.
James Ballard Moore
BY
Loftus, Moore, Olson & Trexler
attys.

Patented Feb. 28, 1950

2,499,031

UNITED STATES PATENT OFFICE 2,499,031

LIQUID FUEL DISPENSER HAVING A ROTATABLY POSITIONABLE REGISTER

James Ballard Moore, Chicago, Ill.

Application May 10, 1944, Serial No. 534,873

17 Claims. (Cl. 222—23)

This invention relates to liquid fuel dispensing pumps.

Among the objects of the present invention are to provide a dispensing pump for dispensing liquid fuel from a bulk source of liquid, preferably an underground tank, wherein the pump structure is provided with some type of metering mechanism to measure the liquid flow through the dispensing line of the pump and wherein means is provided in association with the measured liquid flow through the dispensing line for registering either the volume of the liquid flow, the total cost of the liquid flow and/or both thereof, and wherein the registering mechanism is turnable into various angular positions about the pump whereby the register may be viewed from various angles relatively to the pump structure corresponding to the different locations of the purchaser with respect to the pump so that he may view the dial without changing his position. To this end the pump and register are provided with clutch means to eliminate false operation of the register when the register is turned; clutch means is provided in the drive between the meter and register for disconnecting the meter drive when the register is turned and for operating the meter in a manner to prevent false registration due to such angular turning; to provide a pump of the service station type having a registering mechanism provided with a register dial wherein the dial may be turned angularly with respect to the body of the pump so that it can be viewed on any particular side desired by the purchaser of the liquid fuel and wherein means is provided to prevent the turning of the register during dispensing, wherein means is provided for stopping the register at predetermined positions disposed angularly about the axis of turning of the register; wherein means is provided to prevent operation of the pumping means and/or the registering means while the registering means is being turned; to provide a service station pump having a turnable dial of the registering mechanism which is provided with a plurality of safeguards to eliminate the possibility of operation of the registering mechanism except when the dial or register is in properly angularly disposed position with respect to the pump; to provide these and other objects of the invention as will be apparent from a perusal of the following specification when taken in connection with the accompanying drawings, wherein—

Figure 1 is a perspective view, partly in section, showing a service station pump provided with the invention;

Figure 2 is a side view of Figure 1 showing the hose support side of the pump;

Figure 3 is a top plan view of Figure 1;

Figure 4 is an enlarged sectional view showing the clutch mechanism for disconnecting the registering mechanism from the meter shaft;

Figure 5 is a similar view showing the clutch in engaged position and the pumping switch mechanism closed; and Figure 6 is a view showing the means for maintaining the turnable dial in one of a number of selected angular positions.

In general the invention comprises a source of a liquid fuel supply, preferably the underground tank 2 into which one end of a dispensing line 4 depends, the bottom of the line being provided with the usual foot valve not shown. This line extends upwardly into an upstanding casing 6 of any type of service station pump. Housed within this casing 6 is any type of pump 8 driven from a motor 10 by the usual driving connections 12. The dispensing line from the pump discharges into the usual type of air separator 14. The dispensing line 16 from the discharge side of this separator 14 passes into any type of liquid displacement meter 18 which, as is well known, is driven by the liquid flow through this meter. The meter shaft 20 is shown as extending upwardly in the casing, and is operable to drive the registering mechanism as hereinafter described.

From the meter the dispensing line 22 passes through the usual sight glass 24 and thence to the line 26, passing outwardly of the housing as at 28 and connects with the usual type of flexible hose 30 having in its terminal the usual type of dispensing nozzle 37 fortified with a manually operated dispensing valve 34. The housing is provided with the usual opening in the side into which the end 36 of the nozzle may be inserted when the nozzle handle 38 is supported upon the nozzle hook 40. This nozzle hook is pivotally mounted as at 42 on the casing 6 and the inner end thereof is provided with an inwardly extending lever 44 having a connection as at 46 to the motor switch 48 for governing the motor 10, and a second rod-like connection 50 which extends upwardly to provide a locking mechanism for the turnable dial head of the registering mechanism as hereinafter described.

It will be understood by those acquainted with the art that when the nozzle hook is removed from the nozzle support 40 and the nozzle support 40 given an upward lift, through the rod 46 the pump motor switch 48 is thrown to the operative position to start the pump and the pump will by-pass in the ordinary manner until the nozzle valve is open at which time spring loaded by-pass mechanism will cease to function and the liquid will flow under pressure through the nozzle as in a dispensing operation and at the same time the liquid flow will operate the meter 18 to drive the meter shaft 20 to actuate the registering mechanism.

In the present device the registering mechanism for the pump is shown as provided within a turnable casing or turret 52 which is turnably mounted upon the stationary housing 6. To this end the upper portion of the housing is provided with a rigid collar 54 to which the upper end of the housing is affixed and this collar 54 is provided with a downwardly depending frame 56 which stationarily supports on its lower inner walls an annular, stationary, ring-like member 58 provided around its inner periphery with a series of notches 60 located and properly spaced angular intervals therearound and selected with respect to positions about the pump at which it may be desirable to turn the registering dial of the turret 52. The bottom of the yoke 56 is provided with a bearing 62 for the lower portion of the meter shaft 20. The meter shaft has pinned thereto as at 64 one portion 66 of a friction clutch. The register shaft 68 is in line with the meter shaft 20 but spaced therefrom as shown at 70. Surrounding the meter shaft is a sleeve 72 which is pinned thereto as at 74. This sleeve is provided with a spline 76 which cooperates with a keyway 78 on a shiftable clutch sleeve 80, the lower end of which is provided with a clutch plate 82 adapted frictionally to engage the clutch plate 66, as shown in Figure 5, in which position the meter shaft 20 through the clutch 66, 82 will drive the register shaft 68. The sleeve 80 is provided with annular flanges 81 providing an annular groove in which the pins 84 project, the said pins being connected to a clutch shifter 86 pivoted as at 88 and forming one part of a bell-crank, the opposite arm 90 of which is provided with a roller 92 operating in the fixed notched annular ring 58. Another projection on the bell-crank such as 94 is provided with a part on a switch 96 adapted to make contact with another part 98 of the switch and which switch is inserted in the motor circuit of the pump motor as hereinafter set forth. The opposite end of the bell-crank 90 is provided with an upstanding lug as at 100 to hold a spring 102, as shown in Figure 5, and which spring is arranged to normally project the roller 92 against the inner wall of the notched ring 58. The opposite end of the spring is held by means of a rigidifying rod 104. This rod is carried by the rotatable ring 63 of the turret. This ring 63 rests upon an upper flange 106 of a stationary ring 54 and thereby provides a bearing for this rotatable turret. The housing 108 of this turret extends outwardly and may be of any desired shape to house the registering mechanism which is to be driven by the registering mechanism 110. This registering mechanism, as shown in Figure 1, is preferably provided on one face only of the housing and it includes a cost register, a volume register, and a unit price per unit of volume register. In addition it also includes a resetting knob 112 which may or may not be extended to opposite sides of the housing as shown in Figure 1. The registering mechanism is of any desired well known type as shown in the prior patented art and is driven in the well known manner from the register shaft 68 as hereinbefore described. The top of the registering turret is closed by any desired type of ornamental top cap 114.

In addition to the foregoing, the dial casing 108 is provided with an annular rail 120 attached thereto as at 122 whereby the operator may grasp this rail for manually turning the dial housing, and for likewise turning the depending mechanism carried thereby including the crank arm 90 for registering the roller 92 thereof with the proper notch 60 whereby when the spring 102 forces the roller into one of those notches the bell-crank will be shifted by means of the spring 102 to actuate the switch mechanism 96, 98 to close the pump motor switch circuit in series with the motor switch on the motor so that the pump will be put in operation and whereby also under the influence of the spring 102 the bell-crank will be moved inwardly to shift the clutch sleeve 80 downwardly whereby to connect the friction clutches 66, 82 and connect the drive from the meter shaft 20 to the register shaft 68 to drive the register when the meter is actuated as during dispensing. When the clutch 82, 66 is made, an alternate clutch plate 83 formed integrally with the sleeve 80 is shifted away from a friction clutch surface 85 disposed on the underside of the ring 62 carried by the dial housing.

In addition, means is provided in association with each one of the notches 60 providing locking means herein shown as a series of notches 128 adapted to receive the locking pin 130 which is slidable through an opening in the stationary ring 54 and is actuated by a lever 132 pivoted at 134 and actuated by the rod 50 when the pump lever 40 is shifted to a pump-on position. If the roller 92 enters one of the notches 60, this will so locate the turnable turret 108 so that one of these notches 128 corresponding to the notch 60 will register with the locking pin 130 so that the lever 42 may be operated to throw the pump switch to an on-position and at the same time the locking pin will lock the turret in this position during dispensing. This prevents the dial head from being turned during dispensing and also prevents the pump being operated except when the head is turned to a predetermined position.

While the pump has but a single dial and a single registering face, it may be turned to any position around the vertical central axis of the pump so that the motorist may view the registering mechanism. This of course means that the registering mechanism may be greatly simplified over the duplicate constructions now in use. In addition, due to the construction hereinafter set forth ample safeguards are provided so that false registration is eliminated. It is understood that when the registering dial casing 108 is turned, it will turn the turret ring 63, and due to the fact that the bell-crank lever 90 is now riding on a high point 61 of the stationary ring 58, the clutch sleeve 80 has been shifted upwardly to make the friction clutch surfaces 83, 85 and to break the friction clutch surfaces 66, 82 and to break the switch contacts 96, 98. Turning of the turret ring 63 with the clutch surfaces 83, 85 engaging will turn the clutch sleeve 80 which, through the spline 76, will turn the sleeve 72 which by reason of its pin connection to the register shaft 68 will turn the register shaft equal angular degrees and in the same direction with the dial housing whereby to prevent false operation of the register. The above mentioned safeguards comprise constructions wherein, during the manual turning of the dial head, the motor pump drive is cut off by the opening of the electrical switch 96, 98 and in addition the meter drive shaft to the registering mechanism is broken at the clutch 66, 82. Furthermore, once the proper location or turning of the dial is effected means is provided to automatically couple the driving mechanism to the meter and the registering mechanism and to make the switch in the motor circuit and likewise to automatically lock the dial turret in the turn position as a condition to throwing the hose switch nozzle support to the pump-on position.

It is important that during the angular turning of the swiveled register head through positions other than those represented by the notches 60, means is provided for preventing false registration due to such turning operation. This is accomplished in the present invention by clutch means in the drive between the meter shaft and the register shaft whereby the meter shaft is disconnected from the register shaft at the clutch surfaces 66, 82 and whereby the register shaft is clutch connected to a part turnable angularly with the register housing, proportionately thereto and in the same direction. This clutch connection comprises the clutch surfaces 83, 85, and this clutch mechanism is automatically shifted as an incident to a turning of the register housing.

Having thus described the invention, what is disclosed and desired to be secured by Letters Patent is:

1. In a liquid dispensing apparatus the combination with a housing, a liquid dispensing line having a portion thereof in said housing and connected with a source of liquid fuel to be dispensed, a pump for causing liquid flow through said line, means for driving said pump, a meter in said line actuated by dispensing flow through said line, registering mechanism, disengageable means for driving the registering mechanism from the meter, said registering mechanism being turnable with respect to said housing to position the mechanism to various locations around the housing, and means automatically operable upon a predetermined angular positioning of said registering mechanism with respect to said housing for causing engagement of said driving means between the meter and the registering mechanism.

2. In a liquid dispensing apparatus the combination of a dispensing line having one end to be connected to a source of liquid fuel to be dispensed and including a pump and a motor for driving the pump, a meter in said dispensing line having a meter shaft, said dispensing line terminating in a dispensing hose provided with a valve controlled nozzle, a housing for said dispensing pump and a registering mechanism including a registering dial mounted on said pump housing and turnable about the central axis of said pump housing to various positions of angular adjustment relatively to said housing whereby said dial may be reviewable from different positions around said housing, and means operated by selected variant angular movements of said registering mechanism and dial with respect to said pump housing for selectively connecting and disconnecting the meter shaft and the registering mechanism.

3. In a liquid dispensing apparatus the combination of a dispensing line having one end to be connected to a source of liquid fuel to be dispensed and including a pump and a motor having a control circuit for driving the pump, a meter in said dispensing line having a meter shaft, said dispensing line terminating in a dispensing hose provided with a valved nozzle, a housing for said dispensing pump and a registering mechanism including a registering dial mounted on said housing and turnable about the central axis of said housing to various positions of angular adjustment relatively to said housing whereby said dial may be reviewable from different positions around said housing, and means operated by a predetermined angular movement of said registering mechanism and dial with respect to said housing for closing a switch in the motor control circuit.

4. In a liquid dispensing apparatus the combination of a dispensing line having one end adapted to be connected to a source of liquid fuel to be dispensed and including a pump and a motor for driving the pump, a meter in said dispensing line having a meter shaft, said dispensing line terminating in a dispensing hose provided with a valve controlled nozzle, a housing for said dispensing pump and a registering mechanism mounted on said housing and turnable about the central axis of said housing to various positions of angular adjustment relatively to said housing whereby said registering mechanism may be reviewable from different positions around said housing, and means operable upon a turning movement of said registering mechanism with respect to said housing for disconnecting the driving means between the meter shaft and said registering mechanism.

5. In a service station pump the combination with a liquid dispensing line connected to a source of liquid supply to be dispensed, a pump in said line, a motor for driving said pump and a switch for said motor, a meter in said line including a meter shaft, said dispensing line terminating in a dispensing hose provided with a valved dispensing nozzle, a main housing enclosing said meter, a nozzle support on said main housing and a switch actuator associated with said support and said nozzle, a connection from said switch actuator to said switch, a register housing turnable on said main housing and including a register and a register shaft, said register housing being turnable about the meter shaft axis into a plurality of positions about the main housing, and means operable during the turning of said register housing for preventing the operation of said switch actuator for throwing the pump motor to on-position.

6. In a service station pump the combination with a liquid dispensing line adapted to be connected to a source of liquid supply to be dispensed, a pump in said line, a motor for driving said pump and a switch for said motor, a stationary meter in said line including a meter shaft, said dispensing line terminating in a dispensing hose provided with a valved dispensing nozzle, a main housing enclosing said meter, a nozzle support on said main housing and a switch arm associated with said support and said nozzle, a connection from said switch arm to said switch, a register housing turnable on said main housing and including a register and a dial therefor, said register housing being turnable about the meter shaft axis into a plurality of positions about the main housing, and means operable during the turning of said dial housing for disconnecting the drive between the meter shaft and the registering mechanism and also for breaking the pump motor circuit.

7. In a service station pump the combination with a liquid dispensing line connectible to a source of liquid supply to be dispensed, a pump in said line, a motor for driving said pump and a switch for said motor, a meter in said line including a meter shaft, said dispensing line terminating in a dispensing hose provided with a valved dispensing nozzle, a main housing enclosing said meter, a nozzle support on said housing and a switch arm associated with said support and said nozzle, a connection from said switch arm to said switch, a register housing turnable on said main housing and including a register and a dial therefor, said register housing being turnable about the meter shaft axis into a plurality of positions about the main housing, clutch means between the meter shaft and the register shaft, and means operable upon the turning of the register housing relatively to the main portion housing for disconnecting said clutch.

8. In a service station pump the combination with a liquid dispensing line adapted to be connected to a source of liquid supply to be dispensed, a pump in said line, a motor for driving said pump and a switch for said motor, a meter in said line including a meter shaft, said dispensing line terminating in a dispensing hose provided with a valved dispensing nozzle, a main housing enclosing said meter, a nozzle support on said housing and a switch arm associated with said support and said nozzle, a connection from said switch arm to said switch, a register housing turnable on said main housing and including a register and a dial therefor, said register housing being turnable about the meter shaft axis into a plurality of positions about the main housing, a clutch between the register shaft and the meter shaft and an indexing device associated with the turnable register housing, and means operatively associated with said indexing device and shiftable upon the turning of said register housing for breaking the clutch connection between the meter shaft and the register.

9. In a service station pump the combination with a liquid dispensing line to be connected to a source of liquid supply to be dispensed, a pump in said line, a motor for driving said pump and a switch for said motor, a meter in said line including a meter shaft, said dispensing line terminating in a dispensing hose provided with a valved dispensing nozzle, a main housing enclosing said meter, a nozzle support on said housing and a switch arm associated with said support and said nozzle, a connection from said switch arm to said switch, a register housing turnable on said main housing and including a register and a dial therefor, said register housing being turnable about the meter shaft axis into a plurality of positions about the main housing, a clutch between the register shaft and the meter shaft and an indexing device associated with the turnable housing, and means operatively associated with said indexing device and actuated upon movement of the register head for interrupting the pump motor circuit, said clutch mechanism being shiftable upon a predetermined positioning of said register housing for coupling the clutch to drive the register from the meter shaft.

10. In a liquid dispensing apparatus, in combination with a support, a dispensing line having one end for connection to a source of liquid fuel to be dispensed and including a pump and a motor for driving the pump, a meter stationarily mounted on said support and connected to said dispensing line, said meter having a meter shaft, said dispensing line terminating in a dispensing hose provided with a valved nozzle, registering mechanism including an actuating shaft, said registering mechanism being mounted upon and bodily turnable relatively to said support about the central axis of the meter shaft to various positions of angular adjustment relatively to said support, whereby said registering mechanism may be viewable from different positions around said support, and means including an engageable and disengageable clutch operated by a bodily turning of said registering mechanism to predetermined position with respect to said support for actuating the shaft of said registering mechanism from said meter in controlled relation with respect to the volume of liquid passing through said meter, and by bodily turning of said registering mechanism to other than said predetermined position for turning the shaft of said registering mechanism in the same direction as and proportional to the bodily turning of said registering mechanism relative to said support.

11. In a liquid dispensing apparatus the combination of a dispensing line having one end connectible to a source of liquid fuel to be dispensed and including a pump and a motor for driving the pump, a meter in said dispensing line having a meter shaft, said dispensing line terminating in a dispensing hose provided with a valved nozzle, a housing for said dispensing pump and a registering mechanism including a registering shaft mounted on said housing and turnable about the central axis of said meter shaft to various positions of angular adjustment relatively to said housing whereby said registering mechanism may be reviewable from different positions around said housing, and means drivingly interconnecting said meter shaft and said register shaft, including selectively engageable and disengageable clutch means operable when said registering mechanism has been bodily turned to a predetermined position for thereafter turning said registering shaft proportionally to the volume of liquid passing through said meter, said last named means including mechanism operable when said registering mechanism is bodily turning relatively to said housing to another predetermined position for turning said registering shaft proportionally to and in the same direction as said registering mechanism is being so bodily turned whereby to prevent false registration.

12. In a combination, a fixed support, a casing swivelly mounted relatively thereto, indicating means mounted within the casing comprising a movable indicating member, a driven shaft journalled in said casing and operatively connected to said indicating member, a drive shaft rotatable relative to said fixed support, and means including engageable and disengageable clutch means disposed between said drive and driven shafts and automatically operated upon swivel movement of said casing to a predetermined position for disconnecting the drive between the drive shaft and the driven shaft and for causing said driven shaft to be rotated by said casing relatively to said drive shaft in the same direction as the movement of the casing and proportional to the swivel movement between said casing and said fixed support when said casing is so angularly adjusted relatively to the fixed support so that the registration of said indicating means is not effected by swivel movement of said casing.

13. In a combination, a fixed support, a casing swivelly mounted relatively thereto, indicating means mounted within the casing comprising a movable indicating member, a driven shaft journalled in said casing and operatively connected to said indicating member, a drive shaft rotatable relative to said support, and engageable and disengageable clutch means interconnecting said drive and driven shafts including means actuatable to shift said clutch upon swivel movement of said casing for causing said driven shaft to rotate relative to said drive shaft in direct proportion to the swivel movement between said casing and the support and in the same direction as the casing when the casing is angularly adjusted relatively to the support so that registration of said indicating means is not effected by swivel movement of said casing, said means including mechanism actuatable when said casing has been shifted to a predetermined position relatively to its support to shift said clutch to provide a driving connection between said drive and said driven shaft to drive said indicator from said drive shaft.

14. In combination, a fixed support, a casing swivelly mounted relatively thereto, indicating means mounted within said casing comprising a movable indicating member, a driven shaft journalled in said casing and operatively connected to said indicating member, a drive shaft rotatable relatively to said fixed support, and selectively engageable and disengageable clutch means automatically operable on swivel movement of said casing for turning the driven shaft in the same direction in which the casing turns and proportional to the swivel movement of the casing, and means operatively associated with said clutch means automatically operative when the casing is turned to predetermined position for thereafter rotating the driven shaft proportionally to the rate of turning of said drive shaft.

15. In combination, a fixed support, a casing swivelly mounted relatively thereto, indicating means mounted within said casing comprising a movable indicating member, a driven shaft journalled in said casing and operatively connected to said indicating member, a drive shaft rotatable relatively to said fixed support, means associated with the casing, the drive shaft and the driven shaft automatically operable on swivel movement of said casing for causing the casing to turn the driven shaft with the turning casing to prevent false registration of the movable indicator member and for disconnecting driving connection between the driven shaft and the drive shaft, and means operatively associated with said first means and automatically operative when the casing is turned to predetermined position for thereafter discontinuing driving connection between said casing and said driven shaft and for driving said driven shaft in proportion to the turning of said drive shaft.

16. In a liquid dispensing apparatus the combination with a housing, a liquid dispensing line having a portion thereof in said housing and connected with a source of liquid fuel to be dispensed, a pump for causing liquid flow through said line, means for driving said pump, a meter in said line actuated by dispensing flow through said line, registering mechanism, drive connections for driving the registering mechanism in accordance with the movements of the meter, said registering mechanism being turnable with respect to said housing to position the mechanism to various locations around the housing, and means automatically operable upon a predetermined angular positioning of said registering mechanism with respect to said housing for disabling said drive connections.

17. In combination, a fixed support, a casing swivelly mounted relatively thereto, register means including an indicator and a driven shaft therefor carried by the casing, a drive shaft rotatably journalled in the fixed support and arranged to drive said driven shaft, and means including a selectively engageable and disengageable clutch shiftable upon a selected swivel movement of the casing for holding said driven shaft for movement with said casing for preventing inadvertent operation of said driven shaft during said swivel casing movement.

JAMES BALLARD MOORE.

REFERENCES CITED

The following references are of record in the file of this patent:

UNITED STATES PATENTS

| Number | Name | Date |
|---|---|---|
| 1,563,769 | Marden | Dec. 25, 1925 |
| 2,309,332 | Tanchred | Jan. 26, 1943 |
| 2,319,444 | Crosby | May 18, 1943 |
| 2,340,218 | Grise | Jan. 25, 1944 |